June 29, 1948.  A. D. BECKER  2,444,088
HUSKING ROLLER
Filed July 24, 1946
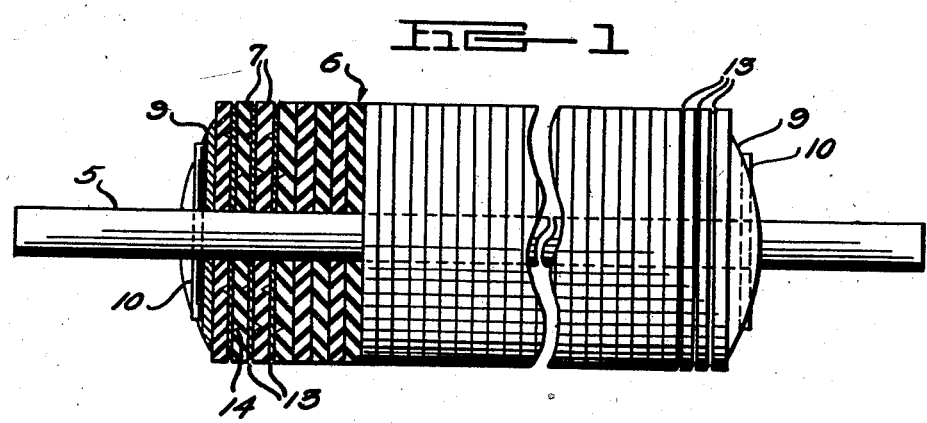
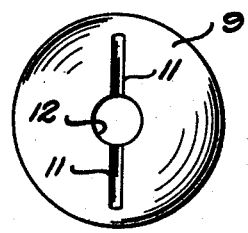
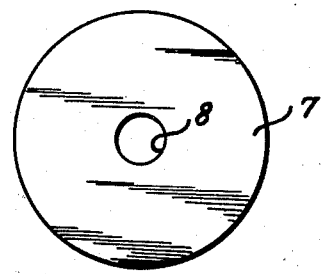
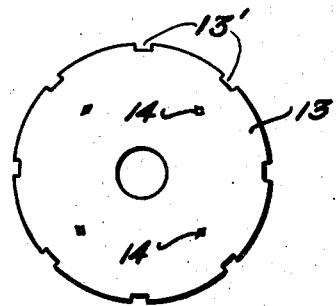
Inventor
ALBERT D. BECKER
By
Attorneys Patented June 29, 1948

2,444,088

UNITED STATES PATENT OFFICE 2,444,088

HUSKING ROLLER

Albert D. Becker, Columbus, Nebr.

Application July 24, 1946, Serial No. 685,858

1 Claim. (Cl. 130—5)

This invention relates to an improved husking roller for the husking bed of a conventional corn picking machine.

The primary object of the invention is to provide a husking roller that will operate in a highly efficient manner under varying conditions of use.

A further object of the invention is to provide a husking roller that may be readily and economically manufactured, and that may be readily adapted to corn picking machines of different makes or constructions.

More specific objects and features of the invention will become apparent from the following description when considered in connection with the accompanying drawing, in which:

Figure 1 is a view, partly in elevation and partly broken away in section, of a husking roller constructed in accordance with the present invention;

Figure 2 is an elevational view of one of the end washers of the roller shown in Figure 1;

Figure 3 is an elevational view of one of the husking disks of the roller;

Figure 4 is an elevation of one of the reinforcing disks used between and connecting certain adjacent ones of the husking disks.

Referring in detail to the drawing, the present husking roller comprises a shaft 5 of suitable length, and a roller body 6 including a plurality of centrally apertured husking disks 7, of flexible resilient material, snugly fitted on the shaft 5. The central aperture 8 of disk 7 originally conforms to the shape and size of the shaft 5 in cross section, and the normal contour of each disk 7 is circular. However, the disks 7 are compacted under high pressure to transversely compressed and radially expanded condition so as to tightly grip the shaft for substantially positive rotation therewith and to provide a rough yieldable peripheral roller surface. In other words, when the disks 7 are compacted under pressure, they expand to slightly different extents at various points about their peripheral edges, thereby presenting the rough surface referred to. In practice, the husking disks may be cut or stamped from such material as tire carcasses, belting, and the like.

Means is provided to secure the husking disks 7 in the compacted condition, said means preferably consisting of metallic washers 9 fitted on the shaft 5 at the outer sides of the end husking disks 7 and secured in place to retain the husking disks under compression, by means of cross pins 10 extending through transverse openings in the shaft 5 at the outer sides of the washer 9. Preferably, the washers 9 have convex outer surfaces and are formed in said surfaces with radially aligned grooves 11 at opposite sides of the central aperture 12 which receives the shaft 5, said grooves 11 being adapted to receive the projecting ends of the cross pin 10 to hold the washer against turning relative to the shaft and to provide a finished construction. Metal reinforcing disk 13 of a diameter substantially the same as the normal diameter of husking disks 7, are interposed between adjacent ones of the husking disks 7 at each end of the roller body. These reinforcing disks are preferably stamped from sheet metal with peripheral notches 13' and have pointed barbs 14 struck laterally therefrom in opposite directions. Thus, when the reinforcing disks are interposed between adjacent husking disks and the latter are placed under compression, the barbs 14 embed themselves in the adjacent husking disks so as to effectively connect the same.

In view of the above, it will be seen that by placing the husking disks under pressure, slippage of the same relative to the shaft is prevented. Also, the metal reinforcing disks 13 prevent excessive wear of the husking disks at the ends of the roller where the tendency to wear is greatest. Further, when the husking disks are placed under compression, they provide a nearly uniform surface having sufficient roughness to provide an admirable husking contact. The notches 13' facilitate production of the rough surface when the husking disks are compressed. In practice, it has been found that husking rollers constructed in accordance with the present invention will perform a clean and highly efficient job so as to eliminate many objections to rollers now in common use.

Minor changes in details of construction are contemplated, such as fall within the scope of the invention as claimed.

What I claim is:

A husking roller comprising an elongated cylindrical shaft, and a laminated cylindrical roller body, said body comprising a plurality of flexible resilient disks each having a central aperture snugly receiving said shaft, relatively thin flexible sheet metal disks having central shaft-receiving apertures and disposed between several of the flexible resilient disks adjacent each end of the body, and means cooperating with the shaft and the endmost disks for clamping the disks under compression, each of said sheet metal disks having lateral barbs projecting from opposite sides thereof and embedded in the adjacent flexible resilient disks and further having a plurality of uniformly spaced peripheral notches which relieved spaced marginal portions of the flexible resilient disks of pressure to give the end portions of the body a rough periphery.

ALBERT D. BECKER.

REFERENCES CITED

The following references are of record in the file of this patent:

UNITED STATES PATENTS

| Number | Name | Date |
| --- | --- | --- |
| 39,835 | Reece | Sept. 8, 1863 |
| 673,768 | Fleming | May 7, 1901 |
| 915,934 | Butler et al. | Mar. 23, 1909 |
| 1,323,171 | Donald | Nov. 25, 1919 |
| 1,418,152 | Logan | May 30, 1922 |
| 1,774,910 | Whatmough | Sept. 2, 1930 |
| 2,308,102 | Paradise et al. | Jan. 12, 1943 |
| 2,416,123 | Siemen | Feb. 18, 1947 |